(12) United States Patent
Dadhich et al.

(10) Patent No.: US 11,122,019 B2
(45) Date of Patent: Sep. 14, 2021

(54) SYSTEMS AND METHODS FOR CLIENT COLLABORATED MIGRATION OF LIVE TLS CONNECTION

(71) Applicant: Oracle International Corporation, Redwood Shores, CA (US)

(72) Inventors: Abhishek Dadhich, Bangalore (IN); Kant C. Patel, Fremont, CA (US); Feroz Alam Khan, Bengaluru (IN); Bhaskar Mathur, Bengaluru (IN); Srinivas Pamu, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 16/570,364

(22) Filed: Sep. 13, 2019

(65) Prior Publication Data
US 2021/0084016 A1   Mar. 18, 2021

(51) Int. Cl.
*H04L 29/06* (2006.01)
*H04L 29/08* (2006.01)

(52) U.S. Cl.
CPC ...... *H04L 63/0435* (2013.01); *H04L 63/0281* (2013.01); *H04L 63/166* (2013.01); *H04L 67/2895* (2013.01); *H04L 69/162* (2013.01)

(58) Field of Classification Search
CPC . H04L 63/0435; H04L 47/564; H04L 69/169; H04L 63/0428; H04L 29/06108; H04L 69/162; H04L 69/08
USPC .......................................................... 713/151
See application file for complete search history.

(56) References Cited

U.S. PATENT DOCUMENTS

| | | | | |
|---|---|---|---|---|
| 5,657,390 | A * | 8/1997 | Elgamal | H04L 29/06 713/151 |
| 6,816,458 | B1 * | 11/2004 | Kroon | H04L 47/564 370/235 |
| 7,406,072 | B1 * | 7/2008 | Somekh | H04L 12/4604 370/352 |
| 9,888,290 | B1 * | 2/2018 | Malhotra | H04N 21/6125 |
| 2003/0014544 | A1 * | 1/2003 | Pettey | H04L 69/169 709/249 |
| 2006/0159098 | A1 * | 7/2006 | Munson | H04L 63/0428 370/394 |
| 2006/0164982 | A1 * | 7/2006 | Arora | H04L 1/1887 370/229 |

(Continued)

OTHER PUBLICATIONS

Bittau et al., "TCP-ENO: Encryption Negotiation Option", RFC 8547, 2019 (Year: 2019).*

(Continued)

*Primary Examiner* — Ondrej C Vostal
(74) *Attorney, Agent, or Firm* — Vista IP Law Group, LLP

(57) ABSTRACT

Described is an improved approach to ensure high availability for established sessions (e.g., application layer sessions) over network connections that negotiates and renegotiates encryption keys (e.g., TLS/SSL) at clean boundaries to ensure in-transit data are properly handled during migration of an application (e.g., a reverse proxy server instance). Connected TCP sessions may be handed off to another application (e.g., from existing proxy server to new/upgraded proxy server) and after establishing a new TLS session with a new encryption key, data transfer may be resumed between a client and a server using the new/upgraded application in a client-server architecture.

21 Claims, 9 Drawing Sheets

(56) References Cited

U.S. PATENT DOCUMENTS

| | | | | |
|---|---|---|---|---|
| 2014/0089441 A1* | 3/2014 | Lukaszyk | ............... | H04L 51/04 709/206 |
| 2014/0359052 A1* | 12/2014 | Joachimpillai | ......... | H04L 69/08 709/217 |
| 2016/0381076 A1* | 12/2016 | Kamble | ................. | H04L 63/20 726/1 |
| 2017/0289041 A1* | 10/2017 | Li | ........................... | H04L 69/16 |
| 2019/0312938 A1* | 10/2019 | Deng | ................... | H04L 67/141 |

OTHER PUBLICATIONS

Borman, "TCP Options and Maximum Segment Size (MSS)", RFC 6691, 2012 (Year: 2012).*

Information Sciences Institute, "Transmission Control Protocol", 1981 (Year: 1981).*

Ito et al., "GridFTP-APT: Automatic Parallelism Tuning Mechanism for Data Transfer Protocol GridFTP", 2006 (Year: 2006).*

Nagle, "Congestion Control in IP/TCP Internetworks", RFC 896, 1984 (Year: 1984).*

Postel, "The TCP Maximum Segment Size and Related Topics", RFC 879, 1983 (Year: 1983).*

Wikipedia, "Transmission Control Protocol", 2021 (Year: 2021).*

Colrain, Carol. "Transparent High Availability for Your Applications" Feb. 2018, NCOUG 2018.

"Database Development Guide" from Oracle Database release 12.2. https://docs.oracle.com/en/database/oracle/oracle-database/12.2/adfns/high-availability.html#GUID-9DB4AA4F-8273-4761-9A51-7FAD6F8298F0.

Escorela, et al. "Transport Layer Security (TLS) Renegotiation Indication Extension", Feb. 2010, from Internet Engineering Task Force (IETF).

Aviram, Nimrod, et al. "DROWN: Breaking TLS using SSLv2" Aug. 2012, Published in Proceedings of the 25$^{th}$ USENIX Security Symposium, 18 Pages.

Ducklin, Paul. "Anatomy of a "goto Fail" Apple's SSL bug explained, plus an unofficial patch for OS X" Feb. 2014.

Koponen, et al. "Resilient Connections for SSH and TLS", Jun. 2006, Published in Proceedings of the annual conference on USENIX '06 Annual Technical Conference, 12 pages.

* cited by examiner

SYSTEMS AND METHODS FOR CLIENT COLLABORATED MIGRATION OF LIVE TLS CONNECTION

FIELD

This disclosure concerns a method, a computer program product, and a computer system for migrating a server instance in a client-server computing system that uses a secured communication layer between the client and server that runs over a TCP connection.

BACKGROUND

In a client-server architecture, a reverse proxy server is generally placed in front of a server inside a private network. Some of the functions of the reverse proxy server are to provide services to clients located outside of the private network on behalf of the server configured inside the private network, retrieve resources from the server on behalf of the clients, and provide network isolation to the server. The reverse proxy server maintains two separate transmission control protocol (TCP) level connections, one TCP level connection with the client and another TCP level connection with the server. A TCP connection between the client and the reverse proxy server is usually secured using a secured connection protocol (e.g., a secure socket layer (SSL), transport layer security (TLS), etc.) to protect messages/communications transmitted over the TCP connection. The secured connection protocol usually includes an encryption key that is negotiated/exchanged (e.g., via a handshake) between the client and the reverse proxy server such that messages sent between the client and the reverse proxy server are encrypted and decrypted using the encryption key that is negotiated between the client and the reverse proxy server. The TCP connection between the reverse proxy server and server does not have an additional secured connection protocol because the TCP connection between the reverse proxy server and the server are already located within a private network.

Conventionally, when planned upgrades and/or maintenance (e.g., a first instance of the reverse proxy server is upgraded to a second instance) need to be performed on the reverse proxy server, existing connections between the client and the reverse proxy server need to be taken down. Taking the existing client connections down on the old reverse proxy server and establishing new client connections with the new reverse proxy server results in degraded service availability due to service outages during the planned upgrade and/or maintenance of the reverse proxy server software on the reverse proxy server.

Additionally, during the actual upgrade and/or maintenance of the reverse proxy server, there are in-transit data that are being sent and received by the reverse proxy server that needs to be managed to ensure that the in-transit data are handled correctly during the upgrade and/or maintenance of the reverse proxy server. This may be referred to hereinafter as establishing a "clean boundary" for the in-transit data to ensure the in-transit data are properly handled and not lost during the upgrade and/or maintenance of the reverse proxy server Therefore, there is a need for a method and/or system for migrating a server instance in a client-server computing system without breaking a communication connection between the client and server that uses a secured connection protocol that runs above a TCP connection between the client and server.

SUMMARY

According to some embodiments, described are improved systems, computer program products, and methods for migrating a server instance on an intermediate server in a client-server computing system that uses a secured communication protocol between the client and the intermediate server over a TCP connection.

In one embodiment, a method may include a client-server architecture, the client-server architecture comprising a client, a server, and an intermediate server running a first application for handling messages transmitted between the client and the server, wherein the messages transmitted between the client and the intermediate server are secured using an encryption key over a first TCP connection and the messages transmitted between the intermediate server and the server are over a second TCP connection. The method may also include initiating a move from the first application to a second application. The method may further include transferring a TCP socket handle used by the first application to the second application by at least detecting a negotiation message sent from the client to the first application. The method may additionally include negotiating a new encryption key between the client and the second application. Additionally, the method may include processing the messages between the client and the second application using the new encryption key by having the second application receive messages using the TCP socket handle transferred from the first application.

In one or more embodiments, the negotiation message is detected using a TCP message peek function. The move from the first application to the second application is a migration from a first version of an application to a second version of the application, the first version and the second version being different versions. The first application and the second application are reverse proxy servers.

In one or more embodiments, the method may also further include stopping acknowledgement receipts from being sent to the server in response to the move being initiated, wherein the acknowledgement receipts correspond to messages that are sent from the server to the first application. The method may also additionally include sending a control message to the client in response to the move being initiated, wherein the control message informs the client that the first application is undergoing the move. The negotiation message initiates the negotiation of the new encryption key between the client and the second application.

According to other embodiments, described are improved systems, computer program products, and methods for migrating an application instance running on a server in a client-server computing system that uses a secured communication protocol between the client and the application instance over a TCP connection between the client and the server. In these other embodiments, a method may include maintaining a client, and an application instance running on a server such that communications between the client and the application instance are secured via an encryption key over the TCP connection. The method may also include initiating an upgrade of the existing application instance running on the server to a new application instance running on the same server. The method may further include negotiating a new encryption key between the client and the new application instance without breaking the TCP connection and/or application level connection between the client and the server. The method may additionally include transferring a TCP socket handle from the existing application instance to the new application instance and processing communications between the client and the new application instance running on the server using the new encryption key.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings). The disclosure will be described and explained with additional specificity and detail through the use of the accompanying drawings in which.

DETAILED DESCRIPTION

Figure 1:
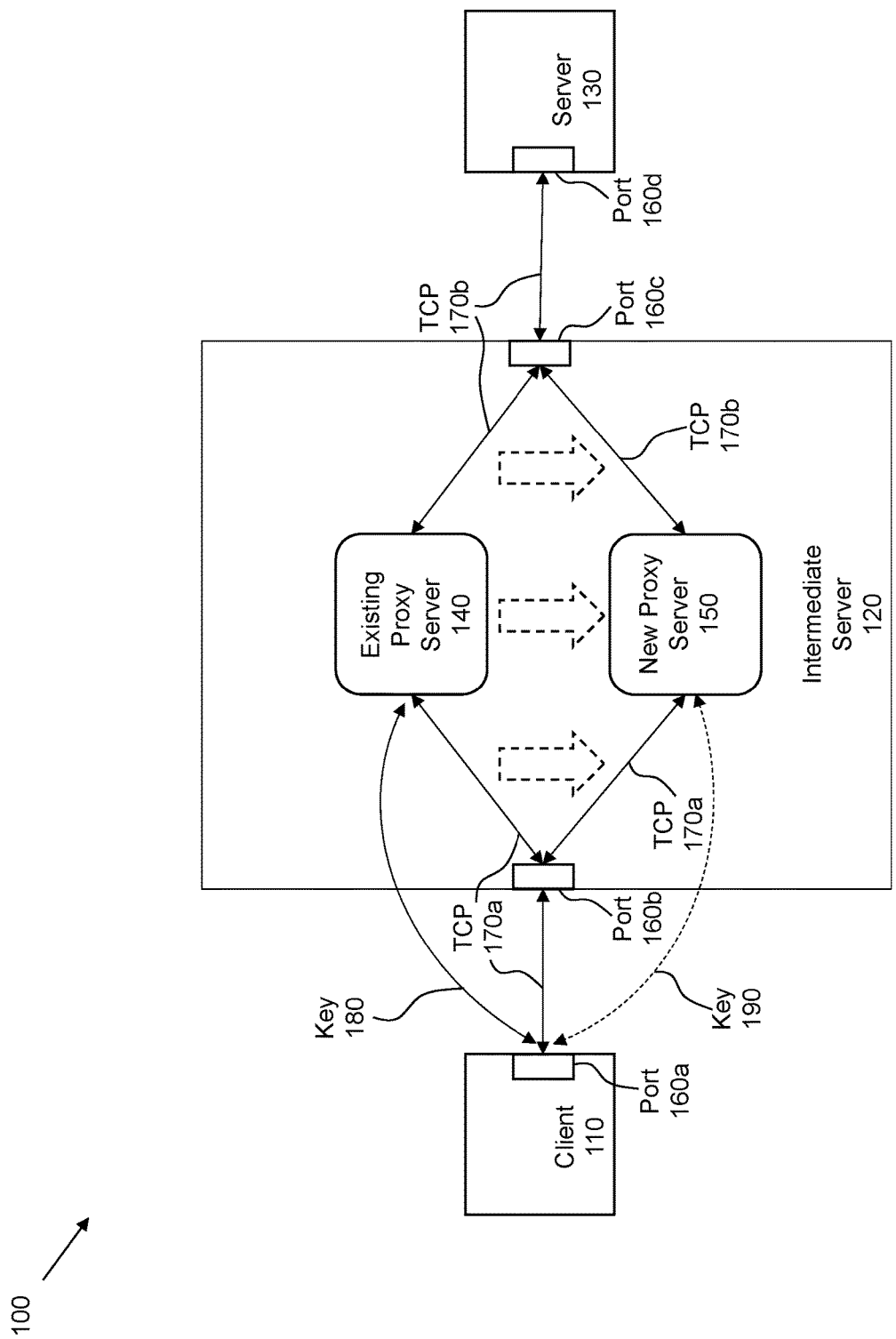
FIG. 1 illustrates a client-server architecture having a client, an intermediate server, and a server, according to some embodiments of the present disclosure.

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Overview

The present disclosure provides an improved approach to ensure high availability for established sessions (e.g., application layer sessions) over network connections that negotiates and renegotiates encryption keys (e.g., TLS/SSL) at clean boundaries to ensure in-transit data are properly handled during migration of any underlying data transport applications (e.g., a reverse proxy server instance). Connected TCP sessions may be handed off to another process (e.g., from existing proxy server to new/upgraded proxy server) and after establishing a new TLS session with a new key, data transfer may be resumed between a client and a server in a client-server architecture.

In one embodiment, migrating, moving, and/or upgrading a server instance to a new server instance that is, as an example, running on an intermediate server between a client and a server in a client-server computing system without requiring a dropping of a communication connection (e.g., at an application level or a TCP connection level) between the client and the intermediate server. The communication connection may comprise a TCP connection and a secured communication protocol that may be configured between the client and the intermediate server to secure data messages sent between the client and the intermediate server, the secured communication protocol running over the TCP connection. In some embodiments, the secured communication protocol may be an SSL or TLS protocol. In an SSL or TSL protocol, a handshake may be established between the client and an instance of a proxy server running on the intermediate server to exchange/negotiate a key (e.g., an encryption key) to be used to secure data messages transmitted between the client and the instance of the proxy server running on the intermediate server.

During the migration of the proxy server that is currently connected to the client, data in transit, if any, being handled by the proxy server and the server before, during or after the migration begins may also be handled in a particular way (discussed further below) to ensure that the data in transit, if any, are also handled properly so that the migration of the proxy server instance to the new proxy server instance may appear seamless to the client currently connected to the server via the intermediate server. Thus, a series of steps may be taken to ensure the migration of the proxy server to the new proxy server can be performed without having to drop existing connections between the client and the intermediate server providing the reverse proxy server services for the server(s) within the private network. The series of steps also helps to make sure any data in transit, if any, is handled properly during the migration such that no data in transit before, during, or after the migration starts is lost as a result of the migration.

Once the move/migration starts, the current/existing proxy server may (1) stop receiving data messages sent from the server via a TCP connection to the existing proxy server, (2) send a control message to the client to inform the client that the existing proxy server is moving/migrating, (3) perform a message peek of data messages received from the client to determine whether a data message received is either a data message or a negotiation message, (4) upon determination that the data message is a data message, forwarding the data message to the server for processing, (5) upon determination that the data message is a negotiation/handshake message sent from the client, transferring TCP socket handles from the existing proxy server to the new proxy server and establishing a new handshake between the client and the new proxy server to exchange/negotiate a new key to secure data messages sent between the client and the new proxy server, and (6) maintain the new secure connection over the TCP connection between the client and the new proxy server instance to proceed with processing further communications between the client and the server by the new proxy server.

In another embodiment, a client-server system may comprise a client and a server, without an intermediate server. A secured communication protocol (e.g., SSL or TLS that includes an established handshake to negotiate an encryption key) may be established over a TCP connection between the client and an application running on the server. The aforementioned series of steps may be applicable to moving, migrating, upgrading, updating, and/or patching the application on the server without breaking the TCP connection between the client and the application being moved, migrated, upgraded, updated, and/or patched on the server.

Definitions

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1 illustrates a client-server architecture 100 having a client 110, an intermediate server 120, and a server 130, according to some embodiments of the present disclosure. Client 110 may be any computing device such as a computer, desktop, mobile device, etc. that may establish a client-server connection with a server 130 that is residing within a network that may be, as an example, a private network that is secured. The client-server architecture 100 may include an intermediate server 120 that may serve as a reverse proxy server (e.g., existing proxy server 140 and/or new proxy server 150).

A reverse proxy server is a type of proxy server that typically sits behind a firewall in a private network and directs client requests to the appropriate backend server. A reverse proxy provides an additional level of abstraction and control to ensure the smooth flow of network traffic between clients and servers. The existing proxy server 140 and the new proxy server 150 refer to user-mode processes running on a host (e.g., an intermediate server 120) and does not refer to a separate machine or node. Additionally, the term "migration", as used hereinafter, is from one proxy server "instance" to a new proxy server instance (e.g., after upgrading or patching of the proxy server) on the same machine or node (e.g., intermediate server 120), and not across machines. In some embodiments, existing proxy server 140 may be a database server, a data processing server, a business application server, a web server, a software application, an enterprise resource management (ERM) application, a customer relationship management (CRM) application, a cloud-based application running on a server located in a cloud environment, etc. A person have ordinary skill in the art may appreciate that the proxy server disclosed herein may be other types of software applications/services as well. Examples of such software applications/services may include a database server, a data processing server, a business application server, a web server, a software application, an enterprise resource management (ERM) application, a customer relationship management (CRM) application, a cloud-based application running on a server located in a cloud environment, etc. For the purpose of explanation, the existing proxy server 140 and new/upgraded proxy server 150 are used to further disclose the present disclosure.

Initially, the client 110 may connect with the server 130 via the existing proxy server 140 running on the intermediate server 120. The connection between the client 110 and the intermediate server 120 may comprise a TCP connection 170a and a secured connection protocol that is using an existing key 180 to secure communications sent between the client 110 and the existing proxy server 140 running on the intermediate server 120. Since the intermediate server 120 resides behind a firewall (e.g., secured) while the client 110 may not reside in a secured network, extra security measures may be provided to secure the communications sent between the client 110 and the intermediate server 120. The secured connection protocol may be, as an example, an SSL or TLS protocol that may include establishing a handshake between the client 110 and the existing proxy server 140 to exchange/negotiate a key 180. Key 180 may be an encryption key used by the client 110 and the proxy server 140 to encrypt data for sending and to decrypt data that is received by the client 110 and/or the existing proxy server 140 and new proxy server 150.

Initially, the existing proxy server 140 may connect with the server 130. The connection between the existing proxy server 140 running on the intermediate server 120 and the server 130 may comprise a TCP connection 170b without a secured connection protocol. Since both the intermediate server 120 and the server 130 are configured in a private network, communications sent via TCP between the intermediate server 120 and the server 130 may not need additional security, such as SSL or TLS, to secure the communications sent between the intermediate server 120 and the server 130 because they are both situated within the private network.

The TCP connection 170a between the client 110 and the intermediate server 120 may be established via port 160a residing at the client 110 and port 160b residing at the intermediate server 120. Similarly, the TCP connection 170b between the intermediate server 120 and the server 130 may be established via port 160c residing at the intermediate server 120 and port 160d residing at the server 130. On a TCP/IP network, each device has an IP address that uniquely identifies the device (e.g., client 110, intermediate server 120, server 130). Just as the IP address identifies the device, the network port (e.g., ports 160a-160d) identifies the application or services running on the device. The use of ports allows computers/devices to run multiple services/applications.

A connection between two computers uses a socket. A TCP socket may be defined as the combination of an IP address+port number. For example, the TCP socket corresponding to port 160b on the intermediate server 120 may comprise an IP address of the intermediate server and a port number (e.g., port 160b) that is assigned on a device (e.g., the intermediate server 120) to be associated to a service/application (e.g., existing proxy server 140 or new proxy server 150) running on the device. For example, port 160b on the intermediate server 120 may be designated as the client-side socket for the intermediate server 120 so that communications received from and sent to the client 110 by the existing proxy server 140 and/or new proxy server 150 may be performed via the client-side socket that is associated to port 160b. Likewise, the TCP socket corresponding to port 160c on the intermediate server 120 may comprise an IP address of the intermediate server and a port number (e.g., port 160c) that is assigned on the intermediate server 120 to be associated to an existing proxy server 140 or a new proxy server 150 running on the intermediate server 120.

When the existing proxy server 140 is migrated to the new proxy server 150, as indicated by the dashed arrows pointing from existing proxy server 140 to the new proxy server 150, a new handshake may be established between the client 110 and the new proxy server 150 to exchange/negotiate the new key 190 so that communications between the client 110 and the new proxy server 150 over the TCP connection 170a may use the new key 190 to encrypt/decrypt communications sent over the TCP connection 170a. Additionally, the TCP connections between the client and new proxy server may still be maintained via TCP connection 170a over port 160b by the existing proxy server 140 instructing the client to perform a handshake with the new proxy server 150 and transferring the TCP socket handles corresponding to port 160b and 160c on the intermediate server 120 to the new proxy server 150 to manage.

Similarly, the TCP connections between the intermediate server 120 and the server 130 may also be maintained as indicated by TCP connection 170b via port 160c by the existing proxy server 140 transferring the TCP socket handle corresponding to port 160c (e.g., server-side socket) to the new proxy server 150 to manage. Because the TCP socket handles corresponding to port 160b and port 160c may be handed off from the existing proxy server 140 to the new proxy server 150, messages that may be buffered within the respective ports during the migration may be processed by the new proxy server 150 as soon as (1) the new key 190 has been exchanged/negotiated between the client 110 and the new proxy server 150 and (2) the TCP socket handles corresponding to port 160b and port 160c are transferred from the existing proxy server 140 to the new proxy server 150. In some embodiments, both of the TCP socket handles corresponding to port 160b and port 160c are simultaneously transferred/handed off to the new proxy server 150. A person having ordinary skills in the art may appreciate that the existing proxy server 140 and the new proxy server 150 are merely software applications and that the aforementioned disclosure may be implemented for any software application running on an intermediate server or server that may need to be upgraded, patched, moved, and/or migrated as a part of, as an example, a planned maintenance operation performed on the software application. Furthermore, the software application may be communicatively connected to a client via a TCP connection and secured by a secured communication protocol (e.g., TLS, SSL, etc.) that may use an encryption key to secure messages sent between the client and the software application.

Figure 2:
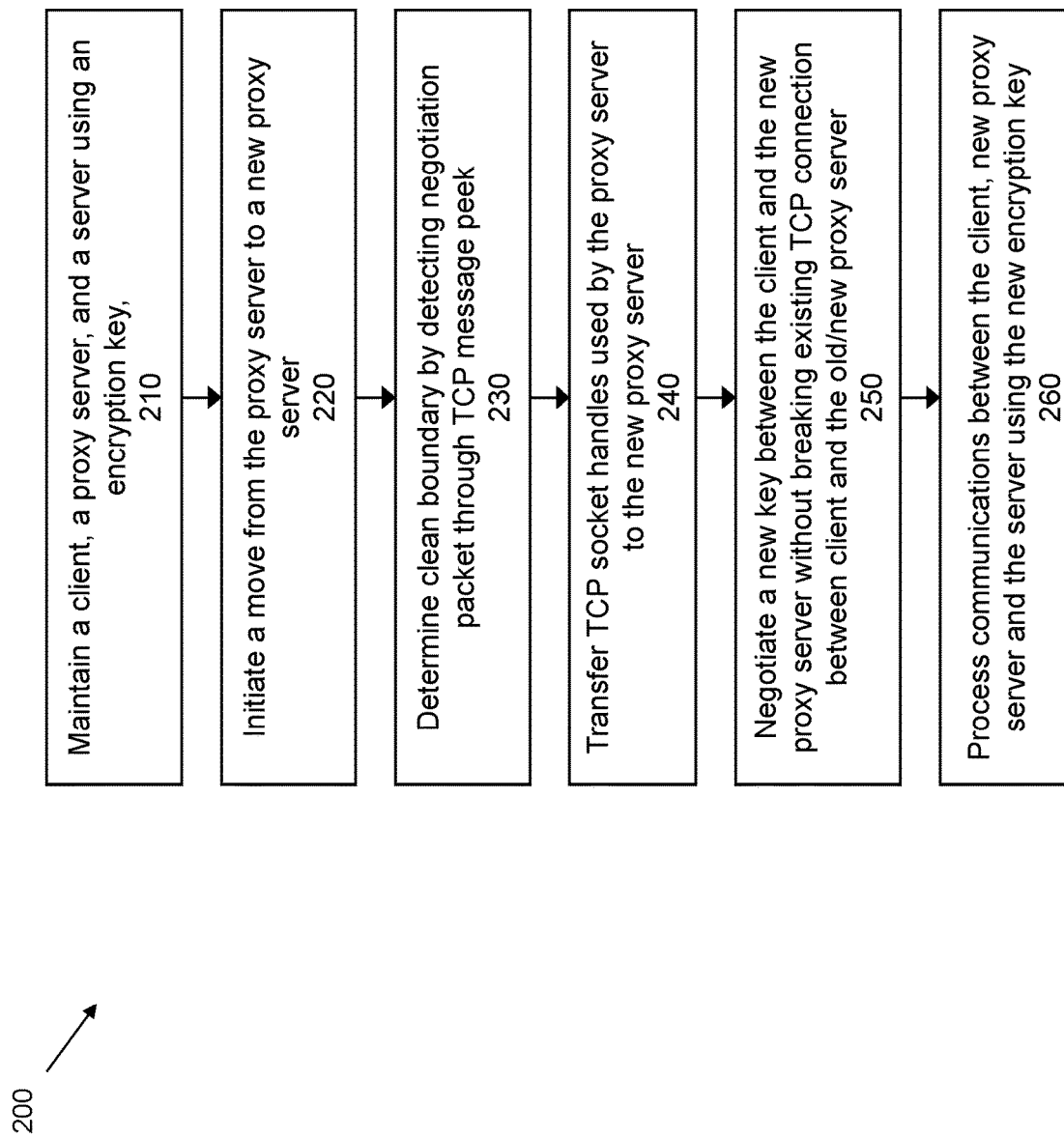
FIG. 2 shows a high-level flowchart of an approach to implement some embodiments of the present disclosure.

FIG. 2 shows a high-level flowchart 200 of an approach to implement some embodiments of the present disclosure. A client-server architecture may be maintained that comprises a client, an intermediate server hosting a proxy server (e.g., existing proxy server), and a server as shown at 210. For example, the client, intermediate server and the server may be communicatively coupled via at least two TCP connections where a first TCP connection between the client and the proxy server may include a secure communication protocol (e.g., SSL, TLS, etc.) that uses an exchanged/negotiated key to encrypt/decrypt (e.g., secure) data segments/messages transmitted between the client and the proxy server. The second TCP connection between the proxy server and the server may not include a secure communication protocol since the proxy server and the server may both be configured with a private network.

At 220, a move/migration may be initiated to migrate processing from the proxy server to a new proxy server. For example, the proxy server may be updated, upgraded or patched to a new proxy server (e.g., a new version of the proxy server). The proxy server may need to be migrated from the existing proxy server to the new proxy server without dropping a client currently connected to the existing proxy server. In some embodiments, the initiation of the migration process may be initiated by a system administrator executing, as an example, a command line execution to initiate the migration of the existing proxy server to the new proxy server. In other embodiments, the initiation of the migration process may be initiated by a computer executing a command to initiate the migration of any software application (e.g., reverse proxy server or proxy server) that needs to be migrated to a different instance of the software application where an existing client connection to the software application needs to be maintained. In some embodiments, the initiation of the migration processing may initiate the new proxy server to be started.

At 230, a clean boundary may be determined for in transit data that is sent from the client to the existing proxy server after the migration has started to ensure in transit data are not lost during the migration from the existing proxy server to the new proxy server. The clean boundary may be determined by detecting a negotiation message sent from the client to the existing proxy server via a TCP message peak command (e.g., MSG_PEEK).

Clean boundary may be defined as a point in the lifetime of a secured TCP connection when there is no data message either sitting in the socket handles or in-transit for which a state is needed to encrypt or decrypt Furthermore, there is no state that matters with relation to a particular message that is sitting inside a TCP socket. Therefore, at a clean boundary, the TCP socket handle is in such a state that it can be transferred from an existing application to the new application and new encryption key negotiated between the client and the new application over the same TCP connection. Data messages prior to this clean boundary have been encrypted using the old encryption key, and data messages after this clean boundary are encrypted using the new encryption key. Detection of this clean boundary is for ensuring that in-transit data is consumed before migration of applications/services.

Figure 3:
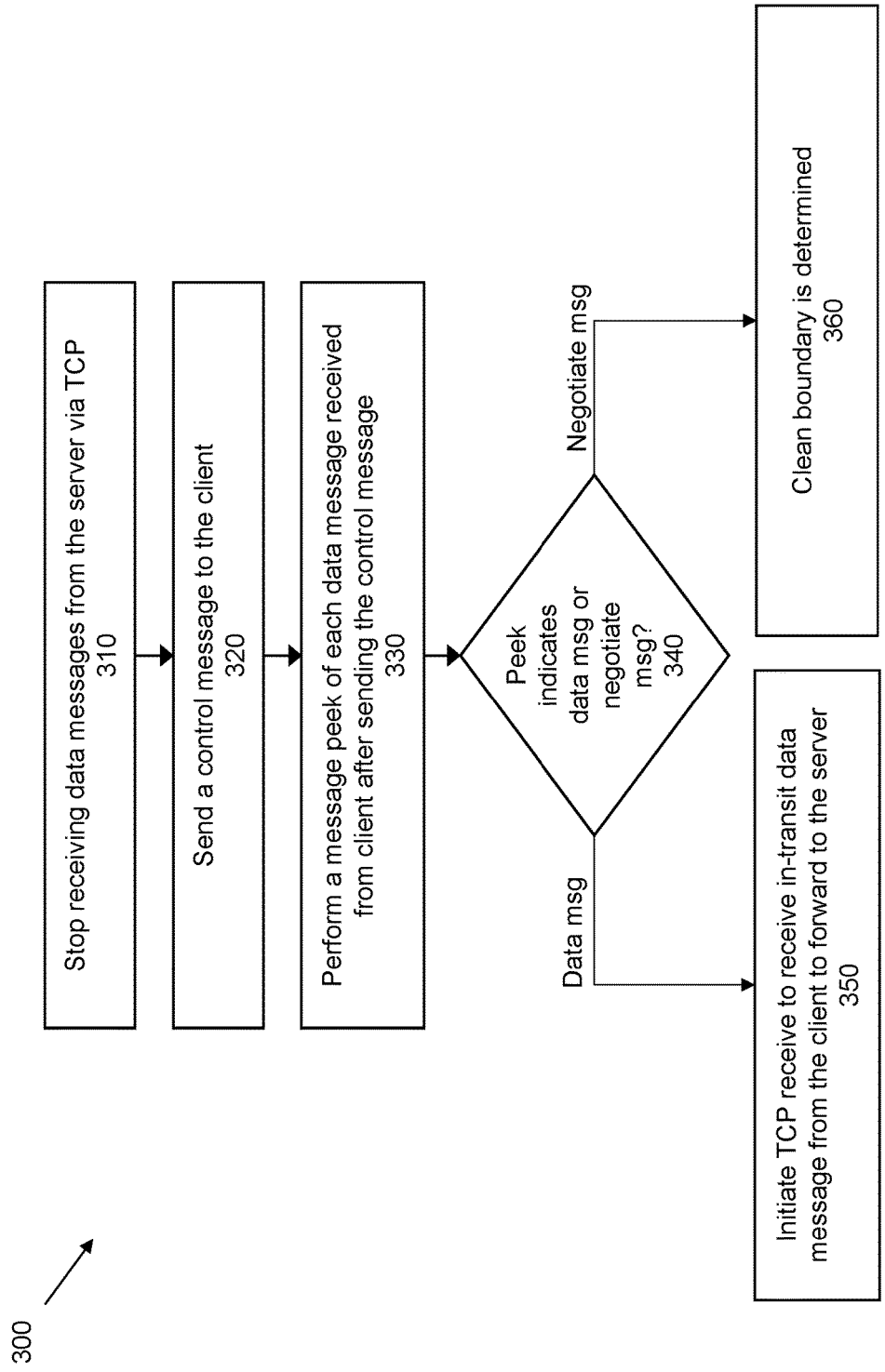
FIG. 3 illustrates a flowchart of an approach to detect clean boundary to negotiate a new encryption key without breaking an existing TCP connection, according to some embodiments of the present disclosure.

FIG. 3 illustrates a flowchart 300 of an approach to determine a clean boundary, according to some embodiments of the present disclosure. Once the migration is initiated (see step 220 of FIG. 2), determination of a clean boundary for in transit data, if any, is important because even though the migration may have been started on the existing proxy server running on the intermediate server, the client, as an example, may still be in the process of sending data to the existing proxy server. Therefore, it is important for the existing proxy server to make sure in-transit data is not affected/lost during the migration. The migration may begin by having the existing proxy server stop receiving data segments/messages sent from the server via the TCP connection as shown at 310.

For example, the existing proxy server may stop issuing TCP receive commands to the server-side socket (e.g., port 160c in FIG. 1 discussed above) in response to the move/migration being initiated so that data messages sent from the server to the intermediate server (e.g., the proxy server) after the migration started will remain in an OS level kernel buffer associated to the server-side socket of the intermediate server until the new proxy server is activated and ready to receive data messages from the server-side socket to transmit to the client. By stopping the sending of acknowledgement receipts of data messages sent to the intermediate by the server (e.g., by not issuing TCP receive commands to the server to acknowledge receipt of the data packets/messages sent from the server), the server may assume the data packets/messages are not received by the existing proxy server, and thus, the server will keep track of the non-received data packets/messages for resubmission when the new proxy server is active and processing messages again.

A control message may be sent to the client as shown at 320 in response to the move being initiated to inform the client that the proxy server is undergoing a migration. The control message may include information to instruct the client to negotiate a new key for future data sends and receives with the new proxy server over the same TCP socket at the intermediate server. The control message may include an identifier of the new proxy server so that the client may establish a communication with the new proxy server to establish a new handshake to negotiate/exchange the new key. The control message may also include information to instruct the client to continue to use the same TCP sockets at the intermediate server to send and/or receive data segments/messages.

A message peek function (e.g., MSG_PEEK) may be performed on each data segment/message received from the client after sending the control message to the client as shown at 330. The message peek function is performed by the existing proxy server to quickly determine whether a particular data segment/message is either one of two types of data segment/message: (1) a normal data message that is intended to be passed to the server for processing; or (2) a negotiation message sent from the client in response to the control message that was sent to the client (see step 320).

If it is determined, as shown at 340 via the message peek function, that the data segment is a normal data message, then the existing proxy server may initiate a TCP receive function to receive the data message (e.g., as in-transit data 524a shown in FIG. 5) from the client by the existing proxy server to forward to the server, as shown at 350. It is this coordination between the stopping of the TCP receive from the server-side socket, in combination with the sending of the control message and performing the message peek function to determine when a clean boundary may be confirmed for in-transit data, if any, during the migration that allows the present disclosure to properly handle in-transit data during the migration of the proxy server to the new proxy server without requiring a dropping of the client connection to the intermediate server.

If it is determined, as shown at 340 via the message peek function, that the data segment/message is a negotiation message, then the negotiation message may indicate a clean boundary currently exists as shown at 360. Clean boundary may be determined because any data messages that was being sent by the client to the existing proxy server after the control message was sent to the client from the existing proxy server has been forwarded to the server for processing (e.g., see step 350) and with the existing proxy server no longer receiving processed data segments/messages from the server, the in-transit data sitting within the kernel buffer of the intermediate server has no state that matters with relation to the particular data packet that is sitting inside the TCP socket corresponding to port 160c of FIG. 1.

Referring back to 240 of FIG. 2, once it is determined by the message peak function that the data segment/message is a negotiation message (e.g., upon determination of the clean boundary), the existing proxy server may transfer the TCP socket handles from the existing proxy server to the new proxy server as shown at 240. For example, the TCP socket handles used by existing proxy server may be transferred to the new proxy server by at least detecting a negotiation message sent from the client to the existing proxy server. The the negotiation message is sent from the client to the first application is in response to the initiation of the move/migration from, as an example, a first version of the application (e.g., the first application such as the existing proxy server) to a second version of the application (e.g., the second application such as the new proxy server) such that the first version and the second version of the application are different versions. The initiation of the move/migration, as discussed above, may include the first application stopping acknowledgement of receipt of messages sent to the first application from the server (e.g., stop sending TCP receive messages to the server for messages received from the server after the initiation of the migration has started). Furthermore, the initiation of the move/migration may also include sending, by the first application, a control message to the client to inform the client that the move/migration of the existing proxy server (e.g., the first application) has started and that before sending any other messages to the server from the client, for the client to initiate negotiation of a new key with the new proxy server (e.g., the second application) by sending a negotiation message instead of data messages. Once the negotiation message is received by the existing proxy server, the existing proxy server may begin a handoff of the TCP socket handles to the new proxy server, as discussed further in FIG. 4.

Figure 4:
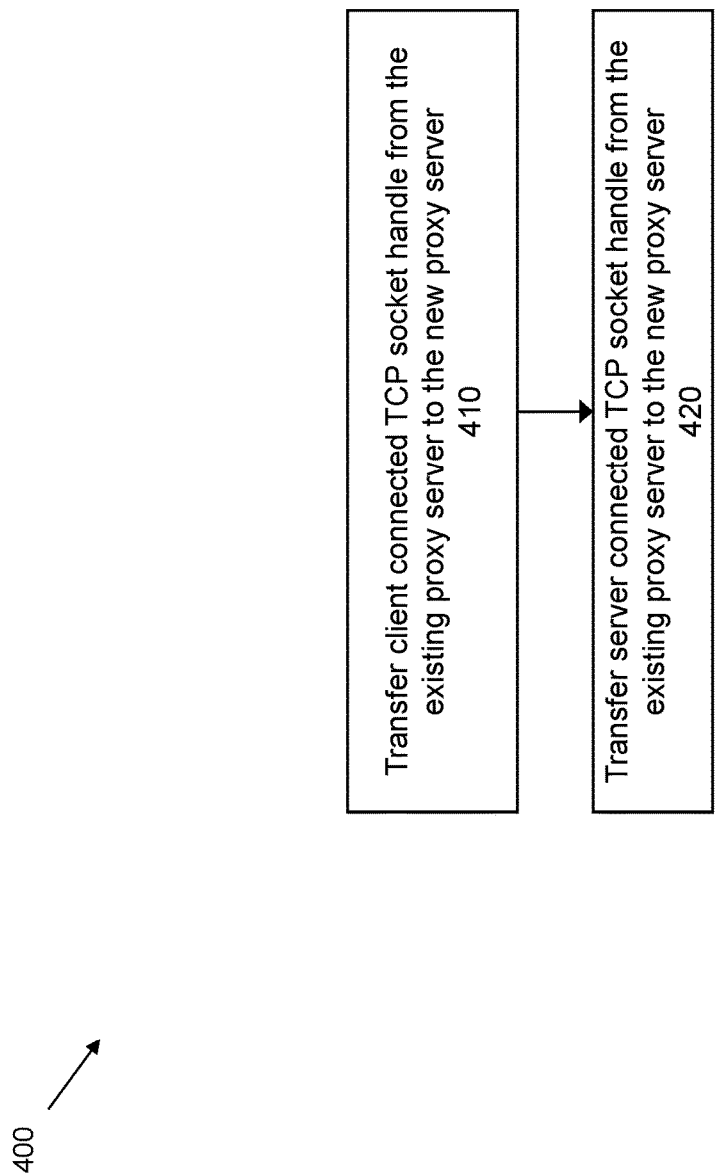
FIG. 4 illustrates a flowchart of an approach to transfer TCP socket handles used by an existing proxy server instance to a new proxy server instance, according to some embodiments of the present disclosure.

FIG. 4 illustrates a flowchart 400 of an approach to transfer TCP socket handles managed/used by an existing proxy server instance to a new proxy server instance, according to some embodiments of the present disclosure. The existing proxy server may transfer a client connected TCP socket handle managed by the existing proxy server to the new proxy server as shown at 410. For example, the client connected TCP socket handle handoff process may pass socket information that may include the IP address of the intermediate server and the TCP port information (e.g., port 160*b*) for the new proxy server to begin communicating with the client. A part of the communication with the client may be to establish a new handshake with the client to negotiate/exchange the new encryption key between the client and the new proxy server (see FIG. 2 at 250 disclosed below). By establishing the new handshake and exchanging the new encryption key, the client may start sending new data packets/messages to the new proxy server and the new proxy server may start sending data packets/messages to the client using the new encryption key over the same TCP connection that was used when the client was communicating with the existing proxy server The existing proxy server may transfer a server connected TCP socket handle managed by the existing proxy server to the new proxy server as shown in 420. For example, the server connected TCP socket handle handoff process may pass socket information that may include the IP address of the intermediate server and the TCP port information (e.g., port 160*c*) for the new proxy server to begin initiating "TCP receive" commands to receive the data processed by the server that has been queuing up in the OS kernel buffer corresponding to the server connected socket of the intermediate server so that the data processed by the server may be sent to the client by the new proxy server.

Referring back to FIG. 2 at 250, upon determination of the clean boundary (e.g., upon receiving the negotiation message from the client), a new key may be negotiated/exchanged between the client and the new proxy server without breaking an existing TCP connection between the client and the old proxy server and/or the new proxy server because clean boundary for possible in transit data is addressed via step 230 of FIG. 2. For example, currently there are no solutions available to migrate an existing client-server session that uses live TLS/SSL and TCP connections combined with data in transit from one proxy server (e.g., existing) to another proxy server (e.g., upgraded version) without breaking existing transport level connection or without application level intervention to assist with re-establishing any broken connection.

Note: TLS and SSL each have their own native support for renegotiating keys. However, this present disclosure does not use any of the existing TLS or SSL renegotiation protocol that are provided with the standard TLS or SSL protocol. The disclosed systems, methods, and processes provide a negotiation of new key process that also ensures in-transit data are handled properly by establishing clean boundaries for in-transit data, if any, during the migration of the existing proxy server to the new proxy server running on the intermediate server. Once a clean boundary can be determined, the new key may be exchanged between the client and the new proxy server.

At 260, once the new encryption keys have been negotiated/exchanged between the client and the new proxy server and the TCP socket handles have been transferred from the existing proxy server to the new proxy server, communications may resume processing between the client, the new proxy server running on the intermediate server, and the server without losing/dropping existing connections between the client and the intermediate server and/or server.

The new proxy server may encrypt data messages received from the server-side socket to send to the client using the new key. In some embodiments, some of the data messages initially received from the server-side socket may include in-transit data received by the existing proxy server using the old key (e.g., key 180 as shown in FIG. 1) that was sent to the intermediate server by the client before, during and/or after the initiation of the migration (e.g., see 220 at FIG. 2). In other embodiments, there may not be any in-transit data to be processed by the new proxy server to forward to the client.

The new proxy server may decrypt data messages received from the client connected TCP socket using the new key as shown at 440. For example, once the handshake is complete between the client and the new proxy server, either the client or the new proxy server may be able to decrypt data messages received from respective listening sockets.

Figure 5:
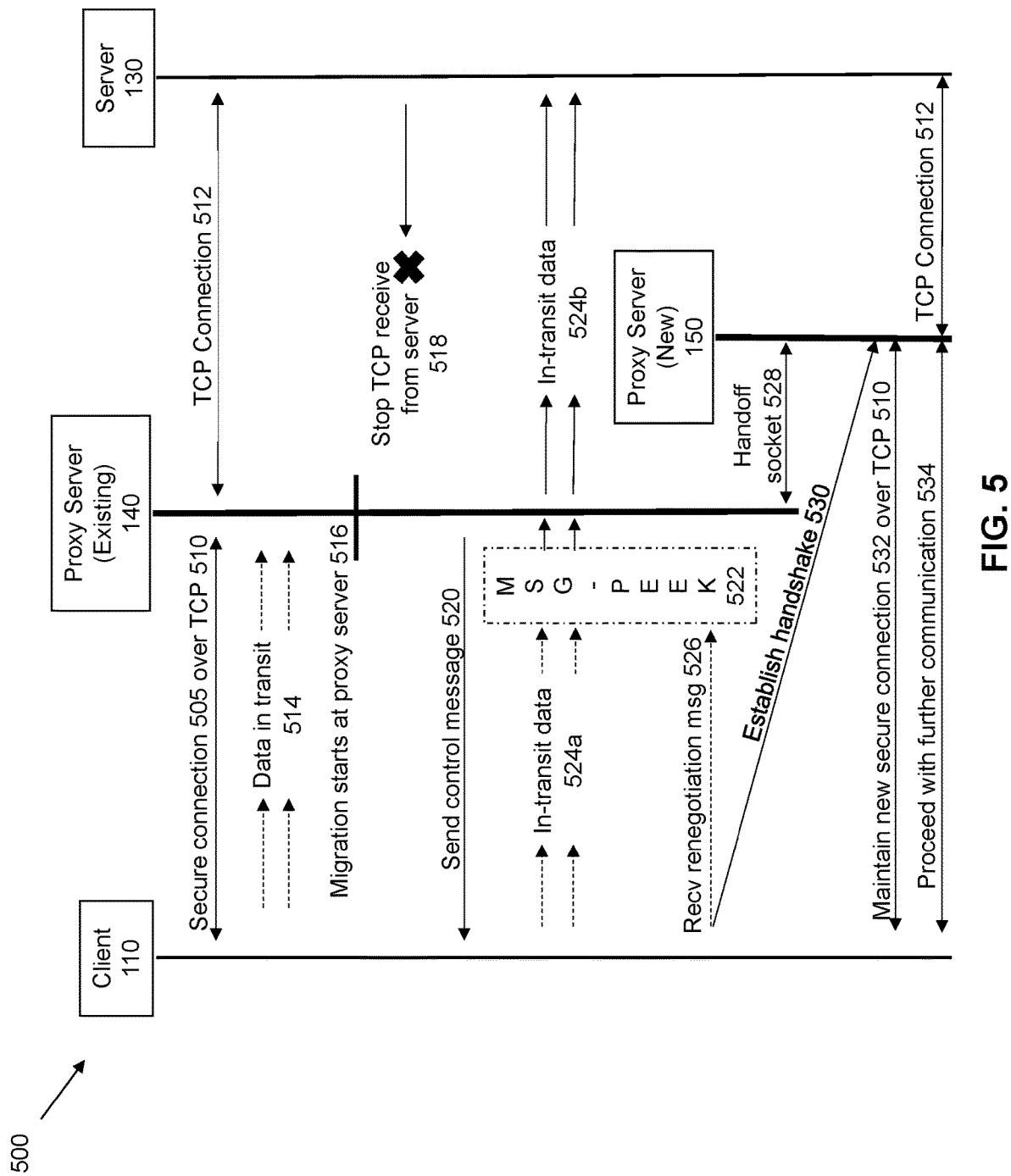
FIG. 5 illustrates an interaction diagram showing a series of system component interactions as used for migrating an existing proxy server instance to a new proxy server instance, according to some embodiments of the present disclosure.

FIG. 5 illustrates an interaction diagram showing a series of system component interactions 500 as used for migrating an existing proxy server instance to a new proxy server instance, according to some embodiments of the present disclosure. FIG. 5 presents a client-server architecture earlier described that can migrate an instance of proxy server to a new instance of the proxy server without causing any connections between a client and an intermediate server hosting the instances of the proxy servers to drop. Specifically shown are client 110, existing proxy server 140, new proxy server 150, and server 130. Note the existing proxy server 140 and the new proxy server 150 are hosted on an intermediate server 120 (not shown in FIG. 5 for clarity purposes but is shown in FIG. 1). An existing secure connection 505 may be configured to run over a TCP connection 510 between the client 110 and the existing proxy server 140. The existing secure connection may be an SSL or TLS session running over the TCP connection 510. An existing TCP connection 512 may be configured to connect the existing proxy server with the server 130.

Data in transit 514 may include data being communicated between the client 110 and server 130 via the existing proxy server 140 before migration of the proxy server begins. In normal operation, as data in transit 514 is passed to server 130 by the existing proxy server 140, server 130 may send processed data corresponding to the data in transit 514 back to the existing proxy server 140 to be sent back to the client 110.

At some point in time, the existing proxy server 140 may need to be patched, updated, upgraded, moved, etc. Once a new proxy server 150 is installed on the intermediate server 120 (not shown), a migration to the new proxy server 150 may be started as shown at 516. A command may be sent to the existing proxy server 140 to start the migration. The new proxy server 150 may be started upon the start of the migration. A connection between the client 110 and the existing proxy server 140 may be using the existing key 180 (as shown in FIG. 1) to secure data messages being transmitted between client 110 and the existing proxy server 140. The existing proxy server 140 may also be configured to stop receiving data messages from the server 130, as shown at 518. As this point, as discussed above, any data messages sent from the server to the intermediate server (e.g., the proxy server) after the migration started will continue to remain in an OS kernel buffer of the intermediate server until the new proxy server is activated and ready to receive data messages from the server-side socket to send to the client.

However, the new proxy server may not receive data messages from the server-side socket until a new handshake has been established between the client and the new proxy server. This will ensure any data in transit that is received from the client before, during and after the migration started will continue to be forwarded on to the server by the existing proxy server for processing. This is because data messages received by the existing proxy server over the secured communication protocol using the TCP connection is decrypted using an existing key established between the client and the existing proxy server, even after the migration has started. These data messages are forwarded to the server for processing. However, the existing proxy server will not be receiving any more data messages from the server once the migration has started. This is because during the migration of the existing proxy server to the new proxy server, data messages processed by the server to be sent to the client by the proxy server should not be received by the existing proxy server or the new proxy server, until a new handshake between the new proxy server and the client is completed such that a new key (e.g., a new encryption key) is established between the client and the new proxy server. This is so that any data messages sent to the client from the new proxy server is encrypted and decrypted using the new encryption key established between the client and the new proxy server, not the old proxy server.

At 520, the existing proxy server may send a control message to the client to notify the client that the proxy server is undergoing migration. Once the existing proxy server sends the control message, the existing proxy server may start "message peeking", as shown at 522, at each data segment/message received from the client 110. The message peeking 522 allows the existing proxy server to quickly inspect the header information of the in-transit data 524a to quickly determine whether the data segment/message received is a data message such as in-transit data 524b that needs to be forwarded to the server 130 for processing. Or if the data segment/message received is a new negotiation message 526 that would indicate to the existing proxy server that the client 110 is ready to establish the handshake 530 between the client 110 and the new proxy server 150 so new data segments/messages sent by the client 110 may be processed/handled by the new proxy server. Additionally, the existing proxy server may also begin handoff of the TCP socket 528 so that the new proxy server 150 can start to read from the TCP sockets corresponding to the server-side socket and so that the new proxy server 150 may also begin communicating with client 110 via TCP connection 510.

In some embodiments, the client 110 may be in the middle of a sending transaction where in-transit data 524a indicates data messages being sent to the existing proxy server from the client 110 even after the migration has been started at 516. In some embodiments, the client 110 may be so busy sending for such a long time that the client 110 may not "read" the TCP socket that contains the control message that was sent by the existing proxy server. In these situations, the client 110 may be configured with a timer to measure an elapsed time since the last receive operation. If it is determined that the sending transaction exceeds a threshold value of the elapsed time since the last receive operation, then the client 110 may pause and/or stop the sending transaction to poll its TCP socket to determine if any data packet/message (e.g., control message) is in the TCP socket to be read before starting the next send operation.

If the client 110 reads the control message and determines that the existing proxy server is undergoing the migration, instead of sending more data segments/messages corresponding to in-transit data 524a to the existing proxy server for processing, the client 110 may instead send a new negotiation message 526 to the existing proxy server to establish a new handshake 530 with the new proxy server 150, as instructed in the control message received by the client 110 from the existing proxy server 140. This way, the migration process does not have to be delayed if any particular client is engaged in a long transaction of sending data and not reading data packets/messages that may contain a control message to instruct the client 110 to establish a new handshake with a new instance of a software that is undergoing migration at a server within the private network.

However, in some embodiments, during the migration of the existing proxy server to the new proxy server, a client connected to the existing proxy server may be idle (e.g., not sending or receiving any data packets/messages) during the migration. To solve this problem, the client 110 may be configured to first poll TCP socket to check if there is any data in the socket receive buffer before sending any data packets/messages. This way, the existing proxy server may handoff sockets to the new proxy server at 528 to complete the migration. Once a client 110 needs to start sending data to the server 130, the client 110 may first read a control message found in the socket receive buffer before sending any data. Upon reading the control message first, the client 110 will know to first establish a handshake 530 with the new proxy server before sending any data to the new proxy server 150.

For example, there may be a situation where no clients are not sending anything for at least 3 minutes. Thus, a clean boundary may be concluded since it may be assumed that since no data has been sent over the TCP sockets in over 3 minutes, then the existing proxy server may not receive a new negotiation message 526 and that there should be no in-transit-data 524a to be concerned about. In these situations, the existing proxy server may simply handoff sockets at 528 to the new proxy server 150. This way, when a client 110 does start to send data packets/messages, the client 110 will first poll/read from its TCP socket to find the control message to establish the handshake 530 with the new proxy server 150 so that the client 110 may maintain the new secure connection 532 over the TCP 510 with the new proxy server 150.

The client 110, new proxy server 150 and server 130 may continue to proceed with further communication 534 over the new secure connection 532 over TCP connection 510 and TCP connection 512.

In another embodiment, a client-server system may comprise a client and a server, without an intermediate server. The approach disclosed above of migrating an application/service running on a server may be applicable to a client and a server architecture that does not include an intermediate server. The client device and the server may communicate with one another via a secured communication protocol (e.g., SSL or TLS that includes an established handshake to negotiate an encryption key) over a TCP connection between the client and the application running on the server. The approach disclosed above and hereinafter is also capable of handling in-transit data being processed during migration of the application/service to a new/upgraded/updated/patched version of the application/service running on the server without having to drop existing connections between the client and the server to safely migrate the application/service while maintaining and managing any in-transit data that may be in process during the migration.

Figure 6:
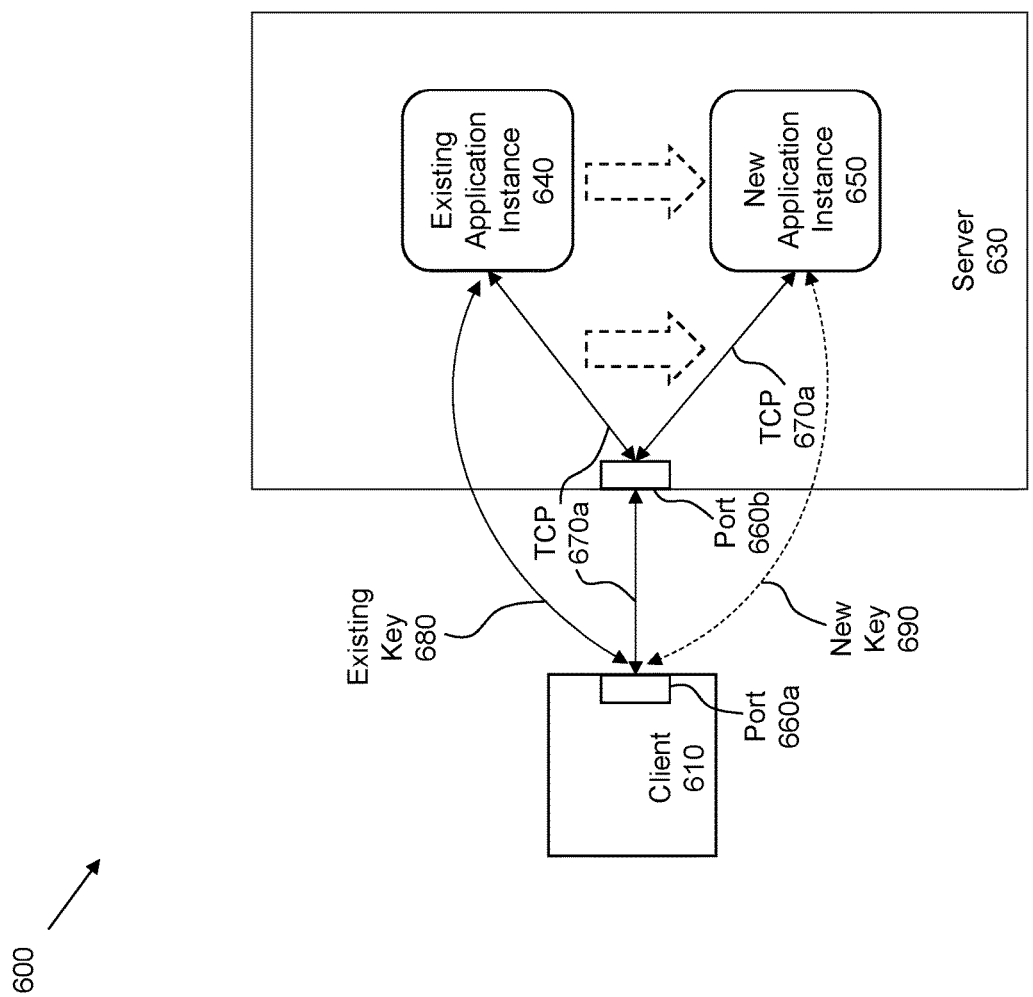
FIG. 6 illustrates a client-server architecture having a client and a server, according to some embodiments of the present disclosure.

FIG. 6 illustrates a client-server architecture 600 having a client 610 and a server 630, according to some embodiments of the present disclosure. Client 610 may be computing device such as a computer, desktop, mobile device, etc. that may establish a client-server connection to a server 630 that is residing within a network that may be, as an example, a private network that is secured.

Initially, the client 610 may connect with the server 630 via an existing application instance 640 running on the server 630. The existing application instance 640 may be any software application or service running on the server 630 that a client such as client 610 may want to connect and communicate with. Examples of existing application instance 640 may be a database server, a data processing server, a business application server, a web server, a software application, an enterprise resource management (ERM) application, a customer relationship management (CRM) application, a cloud-based application running on a server located in a cloud environment, etc.

The connection between the client 610 and the server 630 may comprise a TCP connection 670a and a secured connection protocol that is using an existing key 680 to secure communications sent between the client 610 and the existing application instance 640 running on the server 630. The secured connection protocol may be, as an example, an SSL or TLS protocol that may include establishing a handshake between the client 610 and the existing application instance 640 to exchange/negotiate a key 680. Key 680 may be an encryption key used by the client 610 and the existing application instance 640 to encrypt data for sending and to decrypt data that is received by the client 610 and/or the existing application instance 640.

The TCP connection 670a connection between the client 610 and the server 630 may be established via port 660a residing at the client 610 and port 660b residing at the server 630. As discussed above, the use of ports allows computers/devices to run multiple services/applications when communicably coupled with other computers/devices.

When the existing application instance 640 is migrated to the new application instance 650, as indicated by the dashed arrows pointing from the existing application instance 640 to the new application instance 650, a new handshake may be established between the client 610 and new application instance 650 to exchange/negotiate the new key 690 so that data segments/messages transmitted between the client 610 and the new application instance 650 over the TCP connection 670a may use the new key 690 to encrypt/decrypt the data segments/messages sent over the TCP connection 670a.

Additionally, the TCP connections between the client and new application instance may still be maintained via TCP connection 670a over port 660b by the existing application instance 640 instructing the client to establish a new handshake with the new application instance 650 and transferring the TCP socket handle corresponding to port 660b on the server 630 to the new application instance 650 to manage. Because the TCP socket handle corresponding to port 660b may be handed off from the existing application instance 640 to the new application instance 650, messages that may be buffered within the respective ports during the migration may be processed by the new application instance 650 as soon as (1) the new key 690 has been exchanged/negotiated between the client 610 and the new application instance 650 and (2) the TCP socket handle corresponding to port 660b are transferred/handed off from the existing application instance 640 to the new application instance 650.

Figure 7:
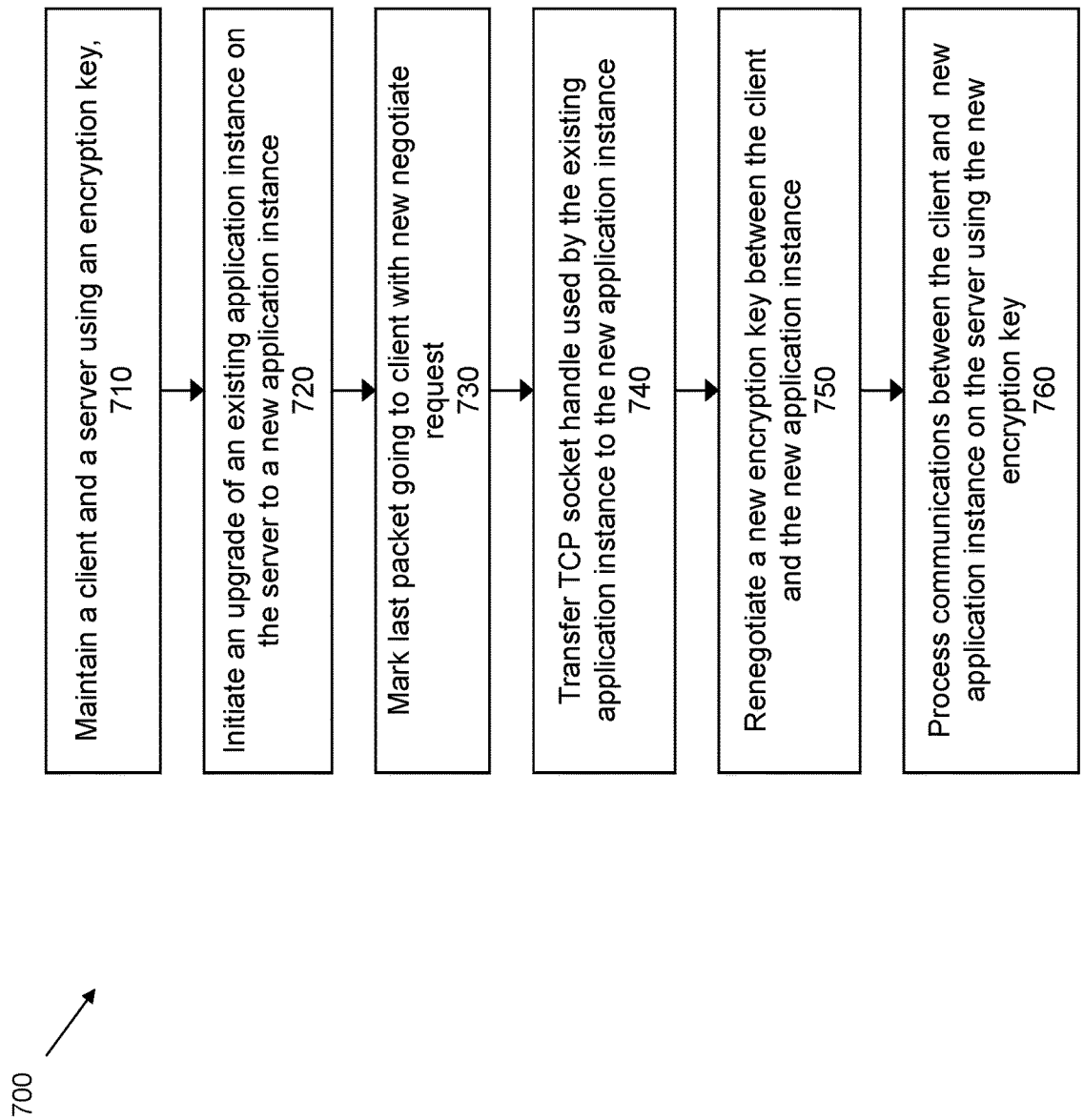
FIG. 7 shows another high-level flowchart of an alternate approach to implement some embodiments of the present disclosure.

FIG. 7 shows another high-level flowchart 700 of an alternate approach to implement some embodiments of the present disclosure. A client-server architecture may be maintained that comprises a client, and a server hosting an existing application instance as shown at 710 where communications sent between the client and the server uses a key (e.g., an encryption key). For example, the client and the server may be communicatively coupled via a TCP connection between the client and the server may also include a secure communication protocol (e.g., SSL, TLS, etc.) that uses an exchanged/negotiated key (e.g., an encryption key) to encrypt/decrypt (e.g., secure) data segments/data messages transmitted between the client and the proxy server.

At 720, an upgrade may be initiated to migrate an existing application instance running on the server to a new/upgraded/updated/patched application instance. For example, the existing application instance may be updated, upgraded or patched to a new application instance (e.g., new version) on the server and that there is a need to migrate the processing of the application instance from the existing application instance to the new application instance without requiring the client currently connected to the existing application instance to drop its current connection with the existing application instance to reconnect with the new application instance.

In some embodiments, the initiation of the migration process may be initiated by a system administrator executing, as an example, a command line execution to initiate the migration of the existing proxy server to the new proxy server. In other embodiments, the initiation of the migration process may be initiated by a computer executed command to initiate the migration of any software application that needs to be migrated to a different instance of the software application where existing client connections to the software application needs to be maintained and in-transit data needs to also be properly handled during the migration. In some embodiments, the initiation of the migration processing may initiate the new application instance to be started.

At 730, after initiation of the migration, the existing application instance may include, in a last data packet/message sent to the client, a new encryption key negotiation request to inform the client that the application is undergoing a migration and that the client may establish a new handshake with the new application instance to negotiate/exchange a new encryption key with the new application instance. Note that for a client and a server configuration, the client and the server can maintain and detect clean boundaries for data packets/messages sent and received between the two computing entities (e.g., the client and the server). This is because in a client and server configuration, there is an understanding that when a client sends a request, the client will wait for a complete response from the server before sending a second request. This way, there are no clean boundary detection issues associated with the client and server configuration, as opposed to when there is an intermediate server situated in between the client and the server. This is because the intermediate server has no way of keeping track of which message from which client to which server is being sent. Thus, having at least one more intermediate server in the mix between a single client and a single server may complicate the management of clean boundary between data being sent between the three entities (e.g., client, intermediate server, and server).

When the existing application instance needs to begin migrating to the new application instance, the existing application instance, when responding to the last request received from the client, may include in the last data segment/message sent to the client corresponding to the last request received, a new encryption key negotiation request (e.g., a control message similar to control message 520 as shown in FIG. 5 to inform the client that the existing application instance is migrating to a new application instance and that before the client sends another request to the existing application instance, the client should first establish a handshake with the new application instance to negotiate a new key. Information for how the client would find the new application instance may be included in the control message sent to the client via the last data packet/ message corresponding to the last request for the client.

At 740, since both the client and the existing application instance are aware that there are no in-transit data and that there is a clean boundary, the existing application instance may start to transfer the TCP socket handle used by the existing application instance to the new application instance to manage data packets/messages received from the client moving forward. Once the new application instance reestablishes the handshake and negotiates the new key with the client, the client may begin to start sending requests to the new application instance using the new key.

At 750, a new encryption key between the client and the new application instance is negotiated because the client, after receiving the last data segment/message that included the new encryption key negotiation request, may initiate a handshake with the new application instance to negotiate/ exchange a new encryption key to secure messages transmitted between the client and the new application instance. Since clean boundary of in transit data is managed between the client and the server during the migration, the negotiation of the new encryption key between the client and the new application instance may be completed over the same TCP connection between the client and the server without requiring a break in the existing TCP connection between the client and the server.

At 760, communications between the client and the new application instance are processed as usual using the new encryption key.

In another embodiments, the high-level flowchart 700 may be extended to move TLS/SSL connections from one application on a server to another application on the server and so on. A typical example of this embodiment is when a client request has to go through multiple server processes on the same computing server/node for authentication and other purposes before getting access to the actual server process (e.g., a database server process). For a TCP connection, following this process of moving a client request from a first application to a second application may be implemented by handing off the TCP socket handle to the second application by the first application when the process needs to move to the second application from the first application. Handing off the TCP socket handle to a different application to manage communications between the client and the different application on the server when the process moves from the second application to the different application.

For a TLS connection, a new TLS session may be re-established each time the processing moves from the first application to the second application and then to the different application. For example, when processing the client request is completed at the first application, the first application may send a response back to the client. Therefore, when the last data packet/message needs to be sent to the client from the first application, the first application may include the control message into the last data packet/message so that the client is informed of the next application (e.g., the second application) that the client will need to establish a new handshake to negotiate/exchange a new key for the second application and so on.

In yet another embodiment, the present disclosure may be implemented, as an example, in a relational database architecture that uses a connection manager to manage connections between clients of the database and database server(s) within the relational database architecture. An example of such a connection manager may be the Oracle Connection Manager®, a multi-purpose networking solution that offers increased scalability, multi-protocol connectivity and secure network access control that is developed by Oracle, Inc. In this example, the connection manager may have 4 different protocol stacking layers: (1) TCP session, (2) TLS session, (3) Oracle Net session, and (4) Application session. With the disclosed embodiments described within this disclosure, the (1) TCP session, (2) TLS session and (4) Application session do not need to be re-established (i.e., existing session connections are retained) during a migration of the connection manager. The TLS session may need to be re-established (as discussed above) to perform a new handshake between the client and the connection manager to obtain the new key for providing secured communication transmissions between the client and the upgraded/updated/patched connection manager.

Furthermore, additional benefits include not having to have knowledge of the Application layer (e.g., (4) Application session) even though clean boundary detection may be needed for moving the secured communication protocol (e.g., TLS/SSL) connection to the new connection manager, which is performed transparently to the (4) Application, (2) TLS layer, and (1) TCP layers. In other words, the Application, the TLS layer, and the TCP layer are not modified (e.g., do not need to be programmed or customized) to implement the present disclosure. Thus, the disclosed embodiments of the present disclosure are fully transparent to upper layers (application), and also to the TLS/SSL layer and TCP layer such that no changes are required to software code in those layers. The presently disclosed embodiments are completely transparent to application/user level at the client and the server. Any operation of data transfer running between the client and the server may keep on running without connection disruption. The disclosed embodiments of the present disclosure do not involve modification of TLS and/or SSL protocols. Furthermore, the disclosed embodiments do not use TLS/SSL renegotiation, or reuse any TLS/SSL session state. As such, the disclosed embodiments are not really TLS/SSL features, but rather, more of a High Availability feature that may achieve zero downtime for planned maintenance operations (e.g., during upgrades, patching, etc.) of applications running on a server that are connected to clients in a secured manner.

What has been disclosed is an improved approach to ensure high availability for established sessions (e.g., application layer sessions) over network connections that perform negotiation of encryption keys (e.g., TLS, SSL, etc.) at clean boundaries to ensure in-transit data are properly handled during migration of any underlying data transport applications (e.g., a reverse proxy server instance, a transaction processing application, a load balancer, etc.). Connected TCP sessions may be handed off from one computer-implemented process to another computer-implemented process (e.g., from existing proxy server to new proxy server) and after establishing a new TLS session with a new key, data transfer is resumed between a client and a server in a client-server architecture.

System Architecture Overview

Figure 8:
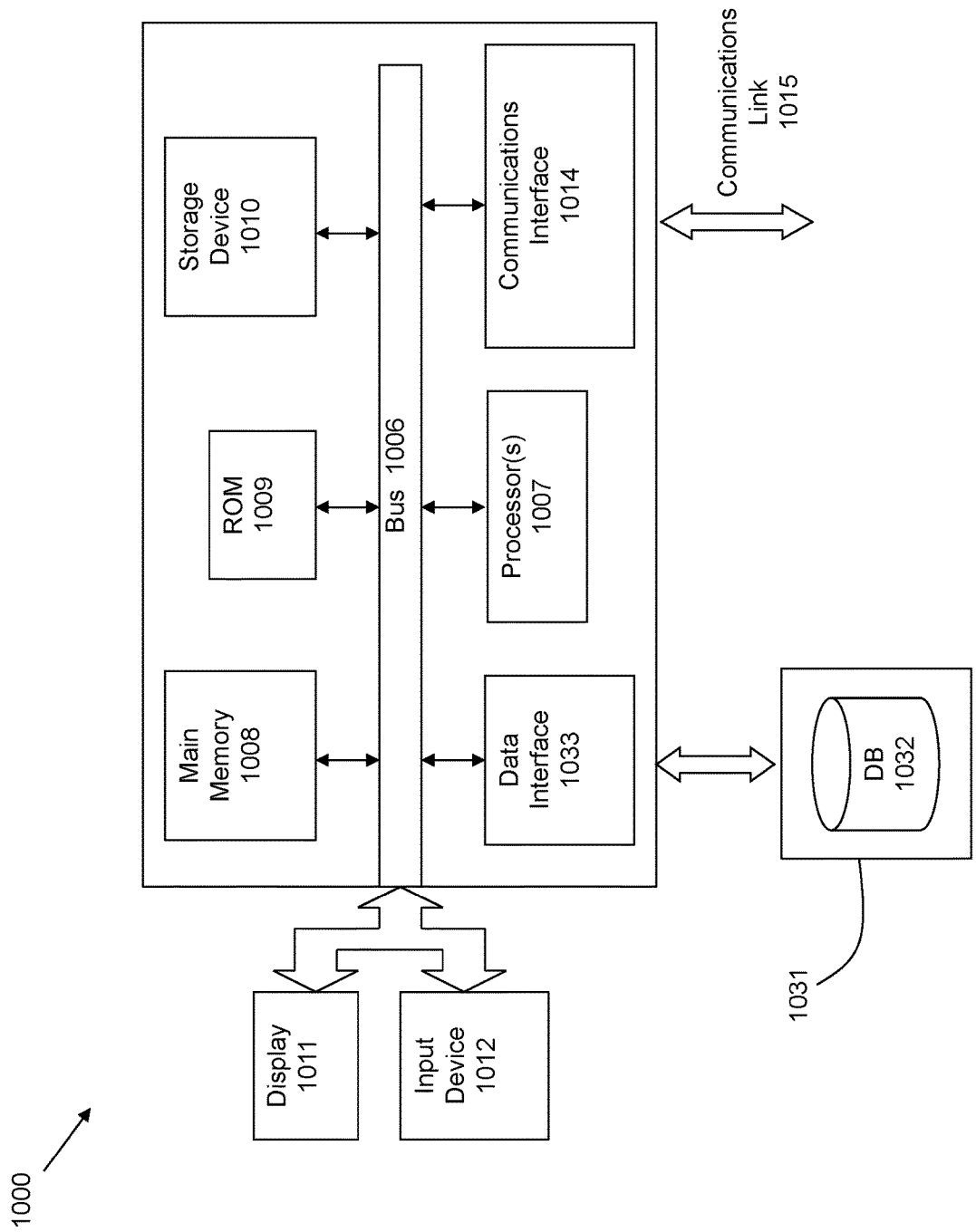
FIG. 8 is a block diagram of an illustrative computing system suitable for implementing an embodiment of the present disclosure.

FIG. 8 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

Figure 9:
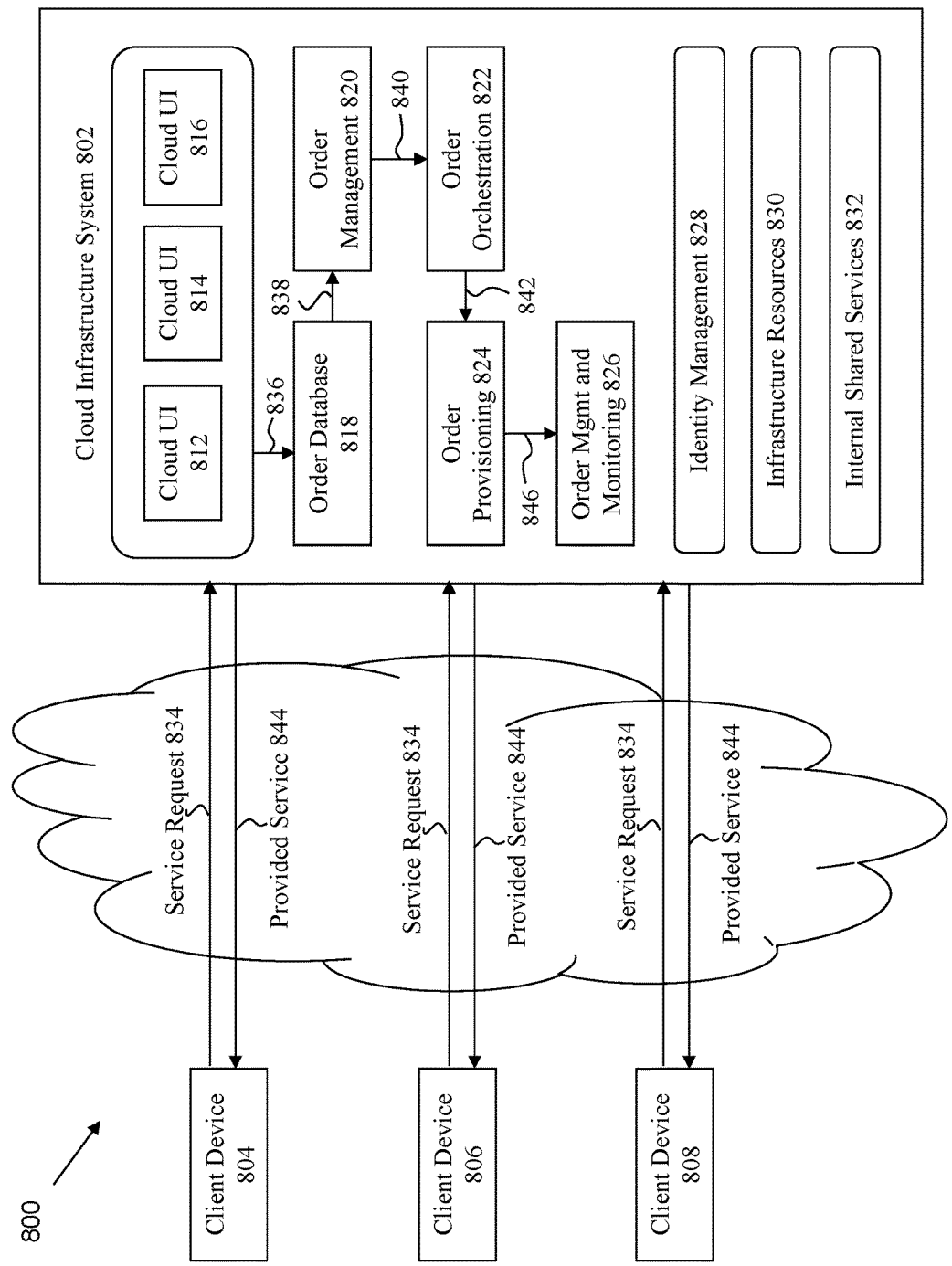
FIG. 9 is a block diagram of one or more components of a system environment by which services provided by one or more components of an embodiment system may be offered as cloud services, in accordance with an embodiment of the present disclosure.

FIG. 9 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 8. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method comprising:
   maintaining a client-server architecture, the client-server architecture comprising a client, a server, and an intermediate server running a first application for handling messages transmitted between the client and the server, wherein the messages transmitted between the client and the intermediate server are secured using an encryption key over a first TCP connection and the messages transmitted between the intermediate server and the server are over a second TCP connection;
   initiating a move from the first application to a second application;
   transferring a TCP socket handle used by the first application to the second application by at least detecting a negotiation message sent from the client to the first application;
   negotiating a new encryption key between the client and the second application; and
   processing the messages between the client and the second application using the new encryption key by having the second application receive messages using the TCP socket handle transferred from the first application.

2. The method of claim 1, wherein the negotiation message is detected using a TCP message peek function.

3. The method of claim 1, wherein the move from the first application to the second application is a migration from a first version of an application to a second version of the application, the first version and the second version being different versions.

4. The method of claim 1, wherein the first application and the second application are reverse proxy servers.

5. The method of claim 1, further comprising stopping acknowledgement receipts from being sent to the server in response to the move being initiated, wherein the acknowledgement receipts correspond to messages that are sent from the server to the first application.

6. The method of claim 5, further comprising sending a control message to the client in response to the move being initiated, wherein the control message informs the client that the first application is undergoing the move.

7. The method of claim 6, wherein the negotiation message initiates the negotiation of the new encryption key between the client and the second application.

8. A system comprising:
a processor; and
a memory to hold a set of program code instructions, in which the set of program code instructions comprises program code to perform: maintaining a client-server architecture, the client-server architecture comprising a client, a server, and an intermediate server running a first application for handling messages transmitted between the client and the server, wherein the messages transmitted between the client and the intermediate server are secured using an encryption key over a first TCP connection and the messages transmitted between the intermediate server and the server are over a second TCP connection, initiating a move from the first application to a second application, transferring a TCP socket handle used by the first application to the second application by at least detecting a negotiation message sent from the client to the first application, negotiating a new encryption key between the client and the second application, and processing the messages between the client and the second application using the new encryption key by having the second application receive messages using the TCP socket handle transferred from the first application.

9. The system of claim 8, wherein the negotiation message is detected using a TCP message peek function.

10. The system of claim 8, wherein the move from the first application to the second application is a migration from a first version of an application to a second version of the application, the first version and the second version being different versions.

11. The system of claim 8, wherein the first application and the second application are reverse proxy servers.

12. The system of claim 8, wherein the set of program code instructions further comprises program code to stop acknowledgement receipts from being sent to the server in response to the move being initiated, wherein the acknowledgement receipts correspond to messages that are sent from the server to the first application.

13. The system of claim 12, wherein the set of program code instructions further comprises program code to send a control message to the client in response to the move being initiated, wherein the control message informs the client that the first application is undergoing the move.

14. The system of claim 13, wherein the negotiation message initiates the negotiation of the new encryption key between the client and the second application.

15. A computer program product including a non-transitory computer readable medium having instructions which, when executed by a processor, causes the processor to perform a process, the process comprising:
maintaining a client-server architecture, the client-server architecture comprising a client, a server, and an intermediate server running a first application for handling messages transmitted between the client and the server, wherein the messages transmitted between the client and the intermediate server are secured using an encryption key over a first TCP connection and the messages transmitted between the intermediate server and the server are over a second TCP connection;
initiating a move from the first application to a second application;
transferring a TCP socket handle used by the first application to the second application by at least detecting a negotiation message sent from the client to the first application;
negotiating a new encryption key between the client and the second application; and
processing the messages between the client and the second application using the new encryption key by having the second application receive messages using the TCP socket handle transferred from the first application.

16. The computer program product of claim 15, wherein the negotiation message is detected using a TCP message peek function.

17. The computer program product of claim 15, wherein the move from the first application to the second application is a migration from a first version of an application to a second version of the application, the first version and the second version being different versions.

18. The computer program product of claim 15, wherein the first application and the second application are reverse proxy servers.

19. The computer program product of claim 15, further comprising instructions to cause the processor to stop acknowledgement receipts from being sent to the server in response to the move being initiated, wherein the acknowledgement receipts correspond to messages that are sent from the server to the first application.

20. The computer program product of claim 19, further comprising instructions to cause the processor to send a control message to the client in response to the move being initiated, wherein the control message informs the client that the first application is undergoing the move.

21. The computer program product of claim 20, wherein the negotiation message initiates the negotiation of the new encryption key between the client and the second application.

* * * * *